United States Patent
Nojima

(10) Patent No.: US 7,965,439 B2
(45) Date of Patent: Jun. 21, 2011

(54) SCANNING DEVICE AND SCANNING TYPE OPTICAL APPARATUS

(75) Inventor: Shigeo Nojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 11/935,055

(22) Filed: Nov. 5, 2007

(65) Prior Publication Data

US 2008/0117499 A1 May 22, 2008

(30) Foreign Application Priority Data

Nov. 16, 2006 (JP) ................................ 2006-310216

(51) Int. Cl.
*G02F 1/29* (2006.01)
*G02F 1/03* (2006.01)
(52) U.S. Cl. ..................... 359/315; 359/245; 359/259
(58) Field of Classification Search .................. 359/245, 359/247, 254–255, 259, 315
See application file for complete search history.

(56) References Cited

U.S. PATENT DOCUMENTS

| 3,502,391 A | * | 3/1970 | Kaminow | 359/305 |
| 5,130,849 A | * | 7/1992 | Valley et al. | 359/571 |
| 5,182,575 A | | 1/1993 | Kato et al. | |
| 5,227,900 A | * | 7/1993 | Inaba et al. | 345/97 |
| 2008/0130094 A1 | * | 6/2008 | Tang | 359/315 |

FOREIGN PATENT DOCUMENTS

| JP | A 01-245780 | 9/1989 |
| JP | A-3-131818 | 6/1991 |
| JP | A-07-294967 | 11/1995 |

OTHER PUBLICATIONS

Nakamura et al., "Wide-angle, low-voltage electro-optic beam deflection based on space-charge-controlled mode of electrical conduction in $Kta_{1-x}Nb_xO_3$," *Applied Physics Letters*, Sep. 28, 2006, vol. 89, No. 131115, pp. 1-3.

* cited by examiner

*Primary Examiner* — Scott Sugarman
*Assistant Examiner* — Dawayne A Pinkney
(74) *Attorney, Agent, or Firm* — Oliff & Berridge PLC

(57) ABSTRACT

A scanning device includes: an optical element in which a refractive index distribution changes according to the intensity of an electric field generated therein such that an incident laser beam is scanned; first and second electrodes provided on two opposite surfaces of the optical element; and a control unit that controls a voltage applied to at least one of the first and second electrodes such that the electric field is generated in one direction and the other direction opposite to the one direction with time in the optical element.

11 Claims, 5 Drawing Sheets

SCANNING DEVICE AND SCANNING TYPE OPTICAL APPARATUS

BACKGROUND

1. Technical Field

The present invention relates to a scanning device and a scanning type optical apparatus.

2. Related Art

In recent years, a scanning type image display apparatus that displays an image by raster scanning beam-shaped light, such as a laser beam, on a projected surface has been suggested. In such device, completely black display may be realized by stopping supply of a laser beam. Accordingly, it becomes possible to realize a display having a higher contrast than, for example, a projector using a liquid crystal light valve. Moreover, the image display apparatus using a laser beam is characterized in that, for example, the color purity is high because the laser beam has a single wavelength and the laser beam is easily shaped (easily focused) because the laser beam has a high coherence. Accordingly, the image display apparatus using a laser beam is expected as a high-quality display that realizes high resolution and high color reproducibility. Moreover, the scanning type image display apparatus does not have fixed pixels unlike a liquid crystal display, a plasma display, and the like. Accordingly, since there is no concept of the number of pixels; the scanning type image display apparatus is also advantageous in that the resolution is easily converted.

in order to generate an image in the scanning type Image display apparatus, it is necessary to scan light in a two-dimensional manner using scanners, such as a polygon mirror and a galvaino mirror. There is a method of scanning light in a two-dimensional manner by causing one scanner to swing in two directions of horizontal and vertical directions. In this case, however, there is a problem that the configuration and control of a scanning system become complicated. For this reason, there has been proposed a scanning type image display apparatus in which a pair of scanners, each of which scans light in a one-dimensional manner, are provided such that the scanners perform horizontal scanning and vertical scanning, respectively. In the related art, it is common to use a polygon mirror and a galvano mirror as both scanners. A projection device that uses rotary polygon mirrors as both scanners is disclosed in JP-A-01-245780.

However, even though the device using the polygon mirror is disclosed in JP-A-01-245780, there is a limit to the polygon mirror or the galvano mirror since the scanning frequency rises as an image format requests a high resolution. For this reason, a system in which an MEMS (micro electro mechanical systems) technique is applied to a high-speed scanner has been recently announced. The scanner (hereinafter, referred to as an MEMS scanner) that uses the MEMS technique is manufactured using microfabrication technology for semiconductor materials, such as silicon. In this case, a mirror supported by a torsion spring or the like is driven by an electrostatic force or the like. The scanner can scan light by causing the mirror to reciprocate using interaction between an electrostatic force and a restoring force of a spring. By using the MEMS scanner, it is possible to realize a scanner having characteristics of a high frequency and a large deflection angle compared with the knoll scanner. Accordingly, it becomes possible to display a high-resolution image.

Here, in order to realize a high-speed MEMS scanner, the mirror should reciprocate about a resonance point. Accordingly, taking a light use efficiency or the like into consideration, a system in which a scanning line is scanned from left to right as viewed from a viewer and then a next scanning line is scanned from right to left (both-side scan) needs to be adopted.

On the other hand, a standard of an image signal was decided on the basis of a CRT (cathode ray tube). Accordingly, the image signal is scanned from left to right and then returns to the left within a short time so as to perform the scanning again in the right direction (one-side scanning). Thus, in the case of the MEMS scanner, some data should be displayed by reversing the order of input signals. As a result, it becomes complicated to control a signal.

Further, an electro optic (EO) scanner is considered as a scanning unit other than the MEMS scanner. The EO scanner is an element that changes the propagation direction of light transmitted through EO crystal by applying a voltage to the EO crystal. Thus, in the case of the EO scanner, a scanning angle can be controlled using a voltage. Accordingly, display based on one-side scanning becomes possible, in the same manner as the CRT.

Moreover, in the EO scanner, EO crystal is interposed between a pair of electrodes, and electrons are injected and the electron distribution is biased by applying a voltage to the electrodes. As a result, the distribution of a refractive index also changes due to the Kerr effect and incident light is deflected toward a side corresponding to a high refractive index, such that scanning of light becomes possible. In addition, since a slope of the refractive-index distribution inside EO crystal is determined on the basis of the amount of electrons injected, that is, an applied voltage, the scanning angle of light emitted from the EO crystal may be controlled by changing the applied voltage.

In the case of scanning light using the EO scanner, however, the distribution of electrons within the EO crystal is deflected. Accordingly, electrons within the EO crystal are continuously deflected due to application of a voltage. If electrons within the EO crystal are continuously deflected, a trouble, such as electrical breaking of an electrode, occurs, and accordingly, the reliability is lowered.

SUMMARY

An advantage of some aspects of the invention is that it provides a scanning device and a scanning type optical apparatus capable of improving the reliability.

According to an aspect of the invention, a scanning device includes: an optical element in which a refractive index distribution changes according to the intensity of an electric field generated therein such that an incident laser beam is scanned; and first and second electrodes provided on two opposite surfaces of the optical element; and a control unit that controls a voltage applied to at least one of the first and second electrodes such that the electric field is generated in one direction and in the other direction opposite to the one direction with time in the optical element.

In the scanning device according to the aspect of the invention, the control unit causes a voltage to be applied to the first and second electrodes, such that an electric field is generated in the optical element. By the electric field, the refractive index distribution of the optical element increases or decreases continuously toward one direction. For this reason, a laser beam propagating in a direction perpendicular to the electric field generated within the optical element is deflected from a low refractive index side toward a high refractive index side.

At this time, the control unit controls a voltage such that the electric field is generated in one direction and the other direction opposite to the one direction with time in the optical element. That is, for example, if only a voltage that causes an electric field in one direction to be generated is applied to the optical element, electrons are deflected in the optical element. However, in the aspect of the invention described above, it is possible to make electrons generated within the optical element less deflected by applying a voltage, which causes an electric field in the other direction to be generated, to the optical element. As a result, since a trouble, such as electrical breaking of electrodes, occurring due to deflection of electrons can be suppressed, the life of the device becomes longer and it becomes possible to improve the reliability of the entire device.

In the scanning device according to the aspect of the invention, preferably, the control unit controls a voltage such that an electric field in the one direction and an electric field in the other direction are alternately generated in the optical element.

In the scanning device described above, a voltage is applied to the optical element such that an electric field is generated in the one direction. Then, a voltage is applied to the optical element such that an electric field is generated in the other direction. Thus, since the electric field In the one direction and the electric field in the other direction are alternately generated in the optical element, it is possible to continuously make electrons less deflected. As a result, it becomes possible to suppress deflection of electrons more efficiently.

Further, in the scanning device according to the aspect of the invention, preferably, the control unit controls a voltage such that a time integration value of an applied voltage when the electric field in the one direction is generated in the optical element is equal to a time integration value of an applied voltage when the electric field in the other direction is generated in the optical element.

In the scanning device described above, the time integration value of an applied voltage when the electric field in the one direction is generated in the optical element is equal to the time integration value of an applied voltage corresponding to an electric field intensity when the electric field in the other direction is generated in the optical element. Accordingly, it is possible to minimize the deflection of electrons generated within the optical element.

Furthermore, in the scanning device according to the aspect of the invention, preferably, the optical element has a composition of $KTa_{1-x}Nb_xO_3$.

In the scanning device described above, the optical element is crystal (hereinafter, referred to as 'KTN' crystal) having composition of $KTa_{1-x}Nb_xO_3$ (potassium tantalate niobate) which is a dielectric material having a high dielectric constant. The KTN crystal has a property in which cubic crystal changes to tetragonal crystal and rhombohedral crystal and a crystal system changes depending on the temperature. It is known that the cubic crystal has a secondary electro optic effect that is large. Particularly in a region near the phase transition temperature from cubic crystal to tetragonal crystal, a phenomenon in which the relative permittivity diverges occurs, and the secondary electro optic effect proportional to the square of relative permittivity indicates a very large value. Accordingly, in the case of crystal having the composition of $KTa_{1-x}Nb_xO_3$, an applied voltage required when changing the refractive index can be suppressed to be low, as compared with other crystal. As a result, it is possible to provide a scanning device capable of reducing the power consumption.

In addition, according to another aspect of the invention, a scanning type optical apparatus includes: a light source that emits a laser beam; and a scanning unit that scans the laser beam emitted from the light source toward a projected surface. The scanning unit includes the scanning device described above.

In the scanning type optical apparatus according to the aspect of the invention, a laser beam emitted from the light source is scanned toward the projected surface by means of the scanning unit. At this time, as described above, it is possible to improve the reliability of the entire device by using a highly reliable scanning device. As a result, it is possible to obtain the scanning type optical apparatus capable of displaying an image on the projected surface with higher resolution without deterioration of image quality while improving the reliability.

Further, in the scanning type optical apparatus according to the aspect of the invention, preferably, the scanning unit performs horizontal scanning.

In the scanning type optical apparatus described above, the scanning unit including an electro optic element performs the horizontal scanning. Accordingly, by using, for example, an inexpensive polygon mirror for vertical scanning, it is possible to realize a scanning type optical apparatus that is not expensive but has a high performance.

In addition, the 'horizontal scanning' refers to high-speed scanning of two directional scanning, and the vertical scanning is low-speed scanning.

Furthermore, in the scanning type optical apparatus according to the aspect of the invention, preferably, a voltage is applied such that the electric field is generated in the one direction or the other direction in the optical element during a horizontal blanking period of a laser beam emitted toward the projected surface.

The horizontal blanking period is a period of time for which a laser beam is scanned from a left end of a projected surface (for example, a screen) to a right end thereof and then returns to the left end again.

In the scanning type optical apparatus described above, a laser beam is emitted to the projected surface, for example, when an electric field in the one direction is generated in the optical element. In addition, since a laser beam returns to the head of a scanning line during the horizontal blanking period, the laser beam is not projected onto the projected surface by turning off a laser beam source. Thus, by applying a voltage to the optical element during the horizontal blanking period such that an electric field in the other direction is generated, electrons are less deflected. Therefore, in the case of using the scanning type optical apparatus as an image display apparatus, for example, it is possible to improve the reliability of the device without having an adverse effect on the quality of an image.

Furthermore, in the scanning type optical apparatus according to the aspect of the invention, preferably, a voltage is applied such that the electric field is generated in the one direction or in the other direction in the optical element during a vertical blanking period of a laser beam emitted toward the projected surface.

The vertical blanking period is a period of time for which a laser beam is scanned from an upper end of a projected surface (for example, a screen) to a lower end thereof and then returns to the upper end again.

In the scanning type optical apparatus described above, by applying a voltage to the optical element during the vertical blanking period longer than the horizontal blanking period such that an electric field is generated in one direction or the other direction where electrons are less deflected, it is possible to make a period of time, for which an electric field is generated in the other direction, long. Accordingly, in order to make the time integration values equal to each other, it is possible to make a voltage applied to electrodes small in a case in which the voltage is applied during the vertical blanking period rather than a case in which the voltage is applied during the horizontal blanking period such that electrons are less deflected. As a result, it becomes possible to suppress a load applied to the first and second electrodes.

Moreover, by applying a predetermined level of voltage during the horizontal blanking period such that an electric field is generated in the other direction and applying a voltage during the vertical blanking period such that the electric field is generated in the other direction, it is possible to further suppress a load applied to the first and second electrodes.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
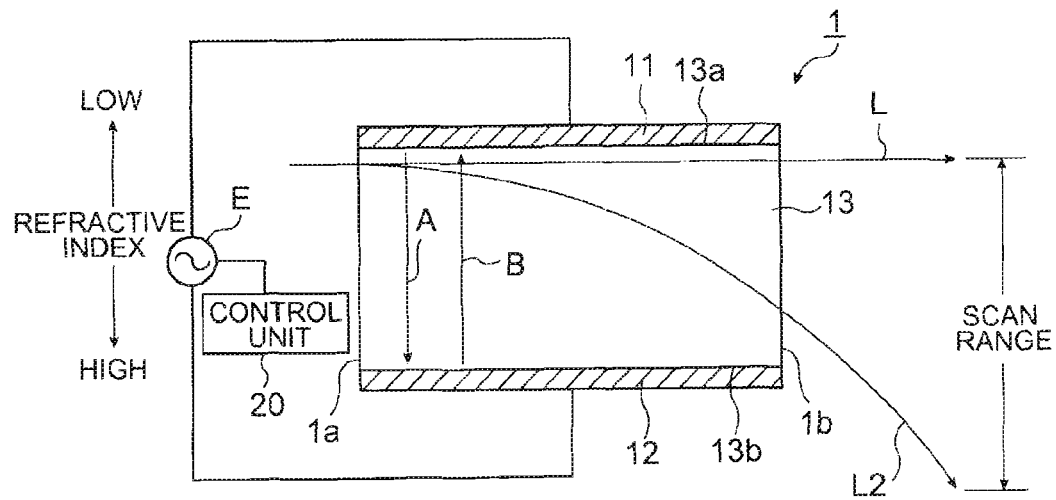
FIG. 1 is a plan view illustrating a scanning device according to a first embodiment of the invention.

Hereinafter, a scanning device and a scanning type optical apparatus according to embodiments of the invention will be described with reference to the accompanying drawings. In addition, the scale of each member is appropriately changed in order to have a recognizable size in the drawings described below.

First Embodiment

In a scanning device 1, the refractive-index distribution changes according to the intensity of an electric field generated therein, such that a laser beam propagating therethrough is scanned. Specifically, as shown in FIG. 1, the scanning device 1 includes a first electrode 11, a second electrode 12, an optical element 13, and a control unit 20.

The optical element 13 is dielectric crystal (electro optic crystal) having an electro optic effect. In the present embodiment, the optical element 13 is formed of a crystal material having the composition of KTN (potassium tantalate niobate; $KTa_{1-x}Nb_xO_3$). Moreover, the KTN crystal is crystal using the Kerr effect (a phenomenon in which birefringence occurs when an electric field is applied to an isotropic material and the effect is proportional to the square of the intensity of an electric field generated by an applied voltage).

In addition, the optical element 13 has a rectangular parallelepiped shape. The first electrode 11 is provided on an upper surface 13a of the optical element 13 and the second electrode 12 is provided on a lower surface 13b. A power source E that applies a voltage is connected to the first electrode 11 and the second electrode 12. In addition, as shown in FIG. 1, sizes of the first and second electrodes 11 and 12 in the propagation direction of a laser beam L propagating through the optical element 13 are almost equal to each other. Thus, an electric field is generated in the optical element 13 between the first and second electrodes 11 and 12. For example, when a voltage, which is higher than a voltage applied to the second electrode 12, is applied to the first electrode 11, an electric field is generated from the first electrode 11 toward the second electrode 12 (direction indicated by arrow 'A'). As a result, a refractive index of electro optic crystal increases from the first electrode 11 toward the second electrode 12.

In addition, as shown in FIG. 1, the optical element 13 is disposed such that a laser beam is incident from a side of the incident end surface 1a, which is close to the first electrode 11, of the scanning device 1. Accordingly, the scanning device 1 according to the present embodiment performs one-side scanning where an incident laser beam is scanned toward one side with the incident laser beam as a reference. That is, since the laser beam incident on the optical element 13 is deflected toward only the second electrode 12 due to the refractive-index distribution of the scanning device 1, a laser beam can be incident from a side of the optical element 13 close to the first electrode 11. As a result, it is possible to make a scan range wide.

Next, an operation of the scanning device will be described.

For example, a voltage of −100 V is applied to the second electrode 12 by means of the power source E and, for example, a voltage of 0 V is applied to the first electrode 11 by means of the power source E. When the voltages are applied to the first and second electrodes and 12, an electric field from the first electrode 11 toward the second electrode 12 is generated in the optical element 13. Accordingly, as shown in FIG. 1, as for the refractive index of the optical element 13, the refractive index close to the first electrode 11 is low and the refractive index gradually increases toward the second electrode 12. As a result, a laser beam propagating in the direction perpendicular to the direction A of an electric field generated within the optical element 13 is deflected. Specifically, the laser beam L incident from the incident end surface 1a of the scanning device 1 is deflected toward the second electrode 12 side where the refractive index of the optical element 13 is high.

In addition, the control unit 20 is provided in the power source E. The control unit 20 controls a voltage applied to the first and second electrodes 11 and 12. That is, a voltage is controlled such that an electric field is generated in the optical element 13 in the direction (one direction) 'A' from the first electrode 11 toward the second electrode 12 and in the direction (other direction; direction opposite to the direction A) 'B' from the second electrode 12 toward the first electrode 11. Specifically, the control unit 20 controls the voltage applied to the first and second electrodes 11 and 12 such that an electric field based on the direction A and an electric field based on the direction B are alternately generated in the optical element 13.

Next, scanning of a laser beam emitted from the scanning device will be described.

Figure 2:
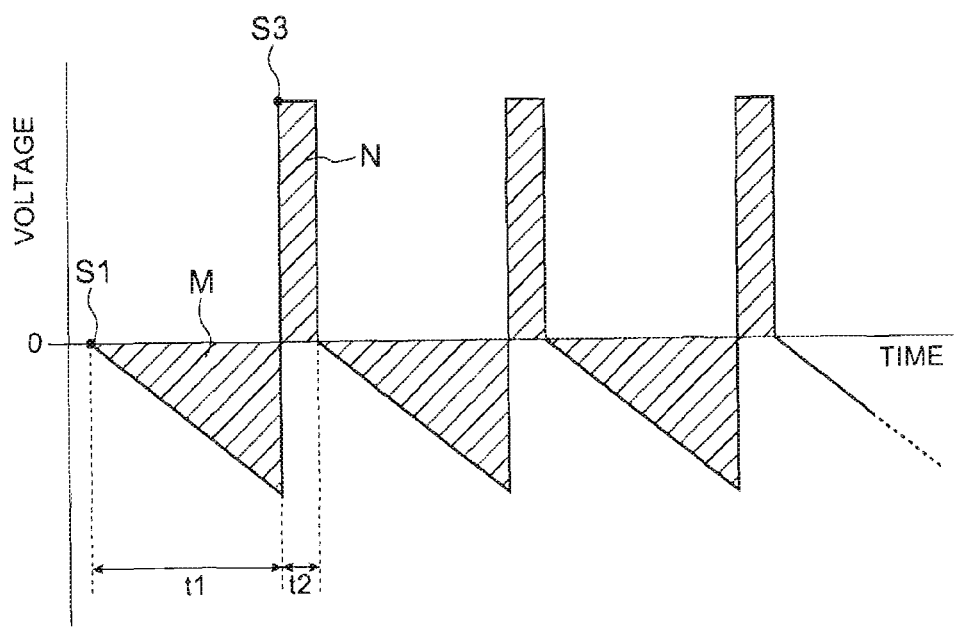
FIG. 2 is a view illustrating a waveform of a voltage applied to electrodes of the scanning device according to the first embodiment of the invention.

A waveform of a voltage applied to the second electrode 12 is, for example, a saw-tooth waveform, as shown in FIG. 2. When a voltage having an initial voltage value S1 (0 V) is applied to the second electrode 12 by means of the control unit 20, as showman in FIG. 1, the laser beam L1 propagating through the optical element 13 goes straight and is then emitted from an emission end surface 1b of the scanning device 1.

In addition, if a voltage value applied to the second electrode 12 gradually increases by the control unit 20 as shown in the voltage waveform of FIG. 2, the refractive index gradient of the optical element 13 increases. Thus, if a voltage applied to the first electrode 11 gradually increases up to a maximum voltage value S2 (−100 V) for a period of time t1, refraction of a laser beam L2 propagating through the optical element 13 gradually increases as an applied voltage within the optical element 13 increases, as shown in FIG. 1. Accordingly, light emitted from the emission end surface 1b of the scanning device 1 is scanned in the same direction as the electric field direction A in the scan range.

Thus, the maximum voltage value S2 (−100 V) is applied to the second electrode 12 by means of the control unit 20, and then a refresh voltage value S3 (+150 V) is applied for a period of time t2. Then, after the period of time t2, a voltage that gradually increases from the initial voltage value S1 to the maximum voltage value S2 is applied again to the second electrode 12. That is, while the laser beam is being scanned, an electric field is generated in the direction A from the first electrode 11 to the second electrode 12, such that electrons are deflected toward the first electrode 11. Then, the refresh voltage value S3 is applied to the second electrode 12 such that an electric field is generated in the direction B from the second electrode 12 to the first electrode 11. As a result, the electrons deflected toward the second electrode 12 return toward the first electrode 11, such that the electrons within the optical element 13 are less deflected.

Here, the refresh voltage value S3 and the period of time t2 are determined by the initial voltage value S1 and the maximum voltage value S2, which are applied to the second electrode 12 at the time of scanning a laser beam, and a time integration value M that is an integral value from the initial voltage value S1 to the maximum voltage value S2 for the period of time t1. Specifically, the refresh voltage value S3 and the period of time t2 are determined such that a time integration value N based on the refresh voltage value S3 and the period of time t2 and the time integration value W are almost equal to each other. That is, the time integration value M of an applied voltage when an electric field is generated in the optical element 13 in the direction A and the time integration value N of an applied voltage when an electric field is generated in the optical element 13 in the direction B are set to be almost equal to each other.

Furthermore, the control unit 20 makes a control such that a light source (not shown) that emits a laser beam is not driven while the refresh voltage is being applied, that is, a voltage is being applied to the second electrode 12 so as to generate the electric field in the direction B.

In the scanning device 1 according to the present embodiment, the control unit 20 controls the power source E such that an electric field is generated in the direction B opposite to the electric field direction A while a laser beam is being scanned.

This enables electrons generated within the optical element 13 to be less deflected. Accordingly, a trouble, such as electrical breaking of the first and second electrodes 11 and 12, occurring due to deflection of electrons can be suppressed. As a result, the life of the entire device becomes longer and it becomes possible to improve the reliability of the entire device.

That is, in the scanning device 1 according to the present embodiment, the reliability can be improved.

In addition, even though the control unit 20 controls a voltage applied to the first and second electrodes 11 and 12 in the above description, the control unit 20 may set one of the first and second electrodes 11 and 12 to GND and control a voltage applied to the other electrode. Moreover, the control unit 20 may change a voltage applied to any one of the first and second electrodes 11 and 12.

In addition, the time integration value M of an applied voltage when an electric field is generated in the direction A in the optical element 13 and the time integration value N of an applied voltage when an electric field is generated in the direction B in the optical element 13 are set to be almost equal to each other in the above description. However, the time integration value M of an applied voltage when an electric field is generated in the direction A in the optical element 13 and the time integration value N of an applied voltage when an electric field is generated in the direction B in the optical element 13 may not be necessarily set to be equal to each other. That is, the deflection of electrons can be suppressed only by applying a predetermined level of voltage such that an electric field is generated in the direction B in the optical element 13. That is, the refresh voltage value S3 and the period of time t2 may be appropriately changed according to properties of crystal used as the optical element 13.

Second Embodiment

Next, a second embodiment of the invention will be described with reference to FIGS. 3 and 4. In addition, in each embodiment to be described below, components common to those in the scanning device 1 according to the first embodiment are denoted by the same reference numerals, and the description thereof will be omitted.

In the present embodiment, an image display apparatus (scanning type optical apparatus) 30 including the scanning device 1 according to the first embodiment as a scanning unit will be described.

Figure 3:
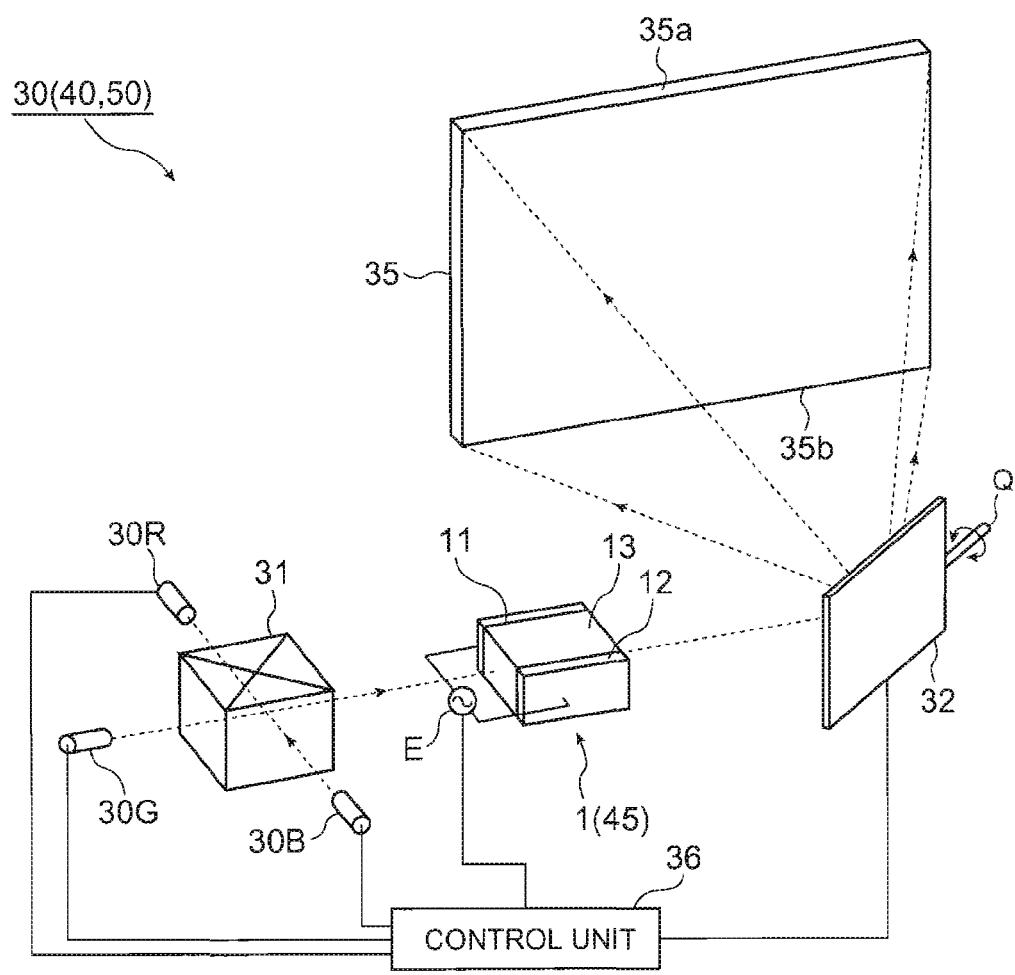
FIG. 3 is a perspective view illustrating an image display device according to a second embodiment of the invention.

As shown in FIG. 3, an image display apparatus 30 includes: a red-colored light source (light source) 30R that emits a red-colored laser beam; a green-colored light source (light source) 30G that emits a green-colored laser beam; a blue-colored light source (light source) 30B that emits a blue-colored laser beam; a cross dichroic prism 31; the scanning device 1 that scans a laser beam emitted from the cross dichroic prism 31 in a horizontal direction of a screen (projected surface) 35; a galvano mirror (scanning unit) 32 that causes the laser beam emitted from the scanning device 1 to be scanned In a direction vertical to the screen 35; and the screen 35 onto which the laser beam scanned from the galvano mirror 32 is projected. The galvano mirror 32 can swing around a rotary shaft Q.

Moreover, a control unit 36 is provided for the power source E and the red, green, and blue colored light sources 30R, 30G, and 30B.

The scanning device 1 is a scanner for horizontal scanning that scans light emitted from the light sources 30R, 30G, and 30B in a horizontal direction (one direction) V of two directions (vertical direction V and horizontal direction h) on the screen 35. The galvano mirror 32 is a scanner for vertical scanning that scans light emitted from the scanning device 1 in the vertical direction (different direction from the one direction) h.

In addition, the 'scanner for horizontal scanning' is a scanner in charge of high-speed scanning of scanning in two directions, and the 'scanner for vertical scanning' is a scanner in charge of low-speed scanning.

Next, temporal relationship between a waveform of a voltage applied to a scanning device and a rotation angle of a galvano mirror will be described with reference to a timing chart.

The waveform of a voltage applied to an electrode of the scanning device 1 is the same as that in the first embodiment. As shown in FIG. 4, the waveform of a voltage applied to an electrode of the scanning device 1 gradually increases from the initial voltage value S1 to the maximum voltage value S2.

Figure 4:
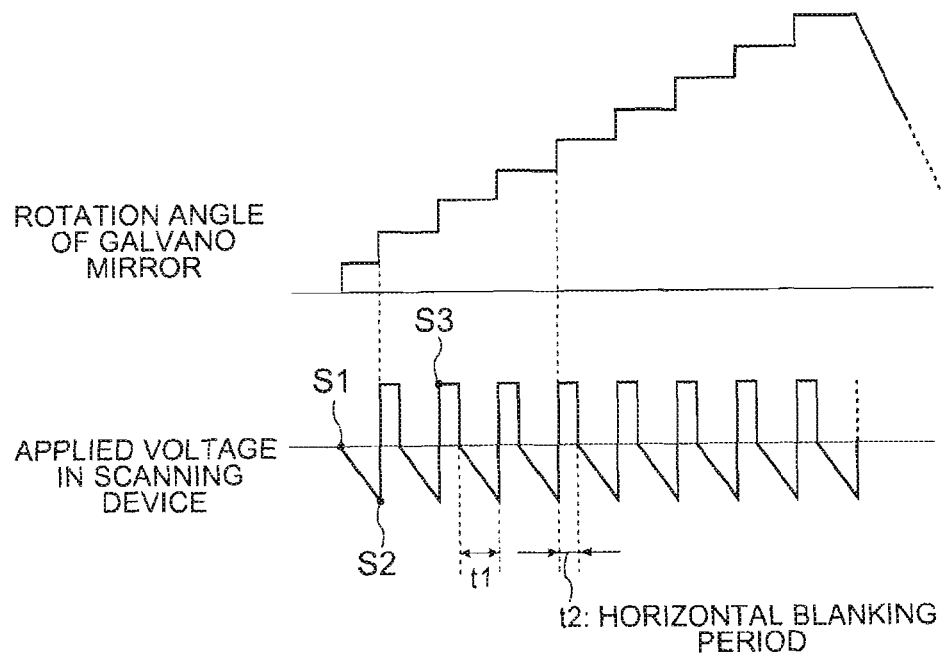
FIG. 4 is a view illustrating a waveform of a voltage applied to electrodes of a scanning device of the image display device according to the second embodiment of the invention.

Further, the rotation angle of the galvano mirror 32 is a waveform that does not swing while a voltage is being applied to the second electrode 12 of the scanning device 1, as shouts in FIG. 4. Furthermore, the rotation angle of the galvano mirror 32 increases by one step when a voltage applied to the second electrode 12 of the scanning device 1 returns from the maximum voltage value S2 to the initial voltage value S1.

In addition, as shown in FIG. 4, the period of time t2 for which the refresh voltage value S3 is applied to the second electrode 12 is a period of time for which a laser beam returns toward the first electrode 11, that is, a horizontal blanking period. Moreover, the control unit 36 controls to stop driving the red, green, and blue colored light sources 30R, 30G, and 30B during the horizontal blanking period. That is, since nothing is displayed on the screen 35 during the horizontal blanking period, an image is not adversely affected even if a voltage is applied to the second electrode 12 of the scanning device 1 during the horizontal blanking period.

Next, a method of projecting an image onto the screen 35 using the image display apparatus 30 having the above configuration according to the present embodiment will be described.

Laser beams emitted from the light sources 30R, 30G, and 30B are mixed in the cross dichroic prism 31 and are then incident on the scanning device 1, as shown in FIG. 3. The laser beams incident on the scanning device 1 are scanned in the horizontal direction of the screen 35 and are then scanned in the direction vertical to the screen 35 by means of the galvano mirror 32, thereby being projected onto the screen 35.

In the image display apparatus 30 according to the present embodiment, while a laser beam is being scanned, electrons generated at the first electrode 11 side are less deflected during a horizontal blanking period. That is, by applying a voltage such that an electric field is generated in the direction B in the optical element 13 of the scanning device 1 during the horizontal blanking period, a trouble, such as electrical breaking of the first and second electrodes 11 and 12, occurring due to deflection of electrons can be suppressed without adversely affecting the quality of an image. As a result, it becomes possible to improve the reliability of the image display apparatus 30.

Third Embodiment

Next, a third embodiment of the invention will be described with reference to FIGS. 3 to 5.

The entire configuration of an image display apparatus 40 according to the present embodiment is the same as that of the image display apparatus shown in FIG. 3 except for a voltage applied to the second electrode 12 of the scanning device 1. Accordingly, this different point will now be described.

Hereinafter, scanning of laser beams emitted from the red, green, and blue colored light sources 30R, 30G, and 30B will be described.

As shown in FIG. 3, a laser beam emitted from a scanning device 45 is scanned from an upper end 35a to a lower end 35b of the screen 35 by means of the galvano mirror 32 and then returns to the upper end 35a of the screen 35 again. Thus, a period for which a laser beam returns from the lower end 35b to the upper end 35a of the screen 35, that is, a period for which the galvano mirror 32 returns from a position, at which the rotation angle of the galvano mirror 32 is a maximum, to an initial position is a vertical blanking period. During the vertical blanking period, a refresh voltage value S5 (+100 V) is applied to the second electrode 12 for a period of time t3 such that an electric field is generated in the direction B in the optical element 13.

Figure 5:
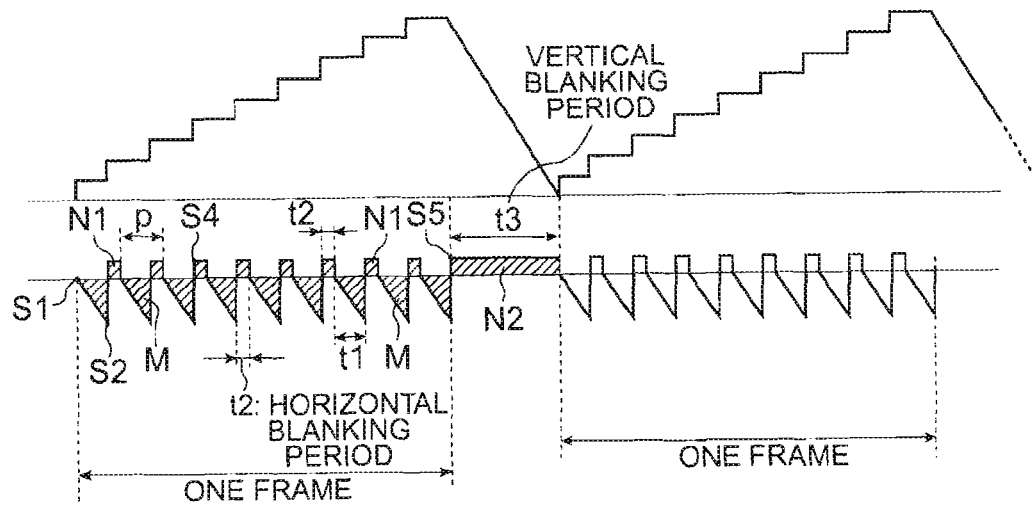
FIG. 5 is a view illustrating a waveform of a voltage applied to electrodes of a scanning device of an image display device according to a third embodiment of the invention.

In addition, as shown in FIG. 5, the waveform of a voltage applied to the second electrode 12 when scanning a laser beam n the scanning device 45 is different from the voltage waveform shown in FIG. 4 in that a refresh voltage value is the refresh voltage value S4 (+100 V) smaller than the refresh voltage value S3.

In addition, the refresh voltage value S5 applied during the vertical blanking period and the period of time t3 are set such that a total sum of a time integration value N2 based on the refresh voltage value S4 and the period of time t2 and a sum of time integration values N1 in each scanning line P in one frame is almost equal to a sum of time integration values M in each scanning line P in one frame.

Moreover, the relationship between the rotation angle of the galvano mirror 32 and a time is shown in a graph of FIG. 4.

In the image display apparatus 40 according to the present embodiment, the vertical blanking period is longer than the horizontal blanking period. Accordingly, it is possible to make a voltage application time long so that an electric field is generated in the direction B in the optical element 13. That is, by applying a voltage such that the electric field is generated In the direction B during the vertical blanking period, the voltage applied to the second electrode 12 may be set to the refresh voltage value S4 in the present embodiment, which is smaller than the refresh voltage value S3 of the image display apparatus 30 according to the second embodiment. This makes it possible to suppress a load applied to the second electrode 12.

In addition, a refresh voltage may be applied during only a vertical blanking period without applying the refresh voltage for every scanning line P. At this time, preferably, a value of the refresh voltage applied during the vertical blanking period and the period of time are determined to be almost equal to a sum of time integration values M in respective scanning lines P in one frame. This configuration is effective for a case in which a large number of scanning lines P are included in one frame and the horizontal blanking period is short. Thus, by applying a refresh voltage during only a vertical blanking period, it becomes possible to display a high-resolution image on the screen 35.

Fourth Embodiment

Next, a fourth embodiment of the invention will be described with reference to FIGS. 6 and 7.

In the image display apparatuses 30 and 40 according to the second and third embodiments, the one-side scanning where an incident laser beam is scanned toward one side with the laser beam as a reference has been performed. However, in an image display apparatus 50 according to the present embodiment, both-side scanning where an incident laser beam is scanned toward both sides with the incident laser beam as a reference is performed. In addition, the entire configuration of the image display apparatus 50 is the same as that of the image display apparatus shown in FIG. 3 except for laser beam scanning performed by a scanning device 51. Accordingly, this different point will now be described. Moreover, the scanning device 51 includes a first electrode 52, a second electrode 53, and an optical element 54.

First, the laser beam scanning performed by the scanning device 51 will be described with reference to FIG. 6. Further, in FIG. 6, in order to make an optical path of a laser beam emitted from a light source easily understood, the cross dichroic prism 31 and the galvano mirror 32 are omitted and only one light source 30G is adopted to be linearly disposed.

Figure 6:
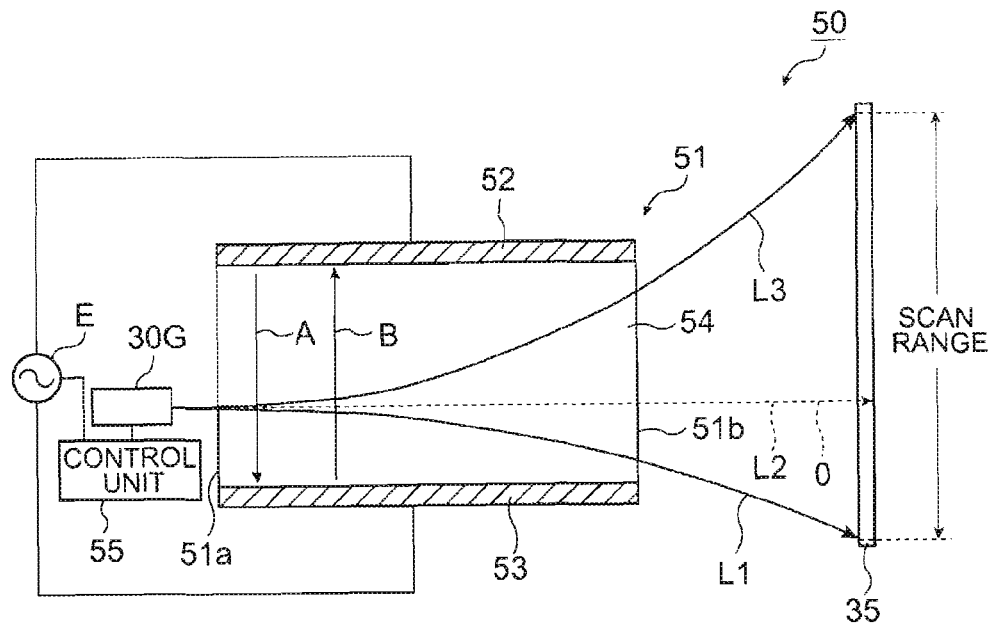
FIG. 6 is a plan view illustrating an image display device according to a fourth embodiment of the invention.

As shown in FIG. 6, the scanning device 51 is disposed such that a laser beam emitted from the light source 30G is incident from a side of an incident end surface 51$a$ located to be slightly close to the second electrode 53 from a central portion of the incident end surface 51$a$. That is, in the scanning device 51 according to the present embodiment, a large scan range can be obtained by causing the laser beam to be incident from the side of the incident end surface 51$a$, which is located to be slightly close to the second electrode 53 from the central portion, in order to make the incident laser beam more largely deflected toward the first electrode 52 than the second electrode 53.

Next, a voltage applied to the first and second electrodes 52 and 53 of the scanning device 51 will be described. In addition, a control unit 55 is provided in the power source E.

A fixed voltage of, for example, 0 V is applied to the first electrode 52 by the power source E. Furthermore, for example, as shown in FIG. 7, the control unit 55 causes a voltage, which gradually increases from an initial voltage value Sa (for example, −100 V) to 0 V, to be applied to the second electrode 53 during a period of time ta and a voltage, which gradually increases from 0 V to a maximum voltage value Sb (for example, +200 V), to be applied to the second electrode 53 during a period of time tb that is twice longer than the period of time ta.

Next, scanning of a laser beam emitted from the scanning device will be described.

When the voltage that gradually increases from the initial voltage value Sa to 0 V is applied to the second electrode 53, an electric field in the direction A is generated in the scanning device 51, as shown in FIG. 6. As a result, a laser beam L1 emitted from the scanning device 51 is deflected toward the second electrode 53 and is then emitted from an emission end surface 51$b$.

Then, when a voltage applied to the second electrode 53 during the period of time ta reaches 0 V, a laser beam L2 emitted from the emission end surface 51$b$ of the scanning device 51 propagates on an optical path O to illuminate a central portion of a scan range.

Then, when a voltage that gradually increases from 0 V to the maximum voltage value Sb is applied during the period of time tb, an electric field in the direction B is generated in the scanning device 51. Then, a laser beam L3 emitted from the scanning device 51 is deflected toward the first electrode 52 and is then emitted from the emission end surface 51$b$. By such voltage application, laser beams emitted from the scanning device 51 of the image display apparatus 50 according to the present embodiment are asymmetrically scanned left and right on the screen 35.

Figure 7:
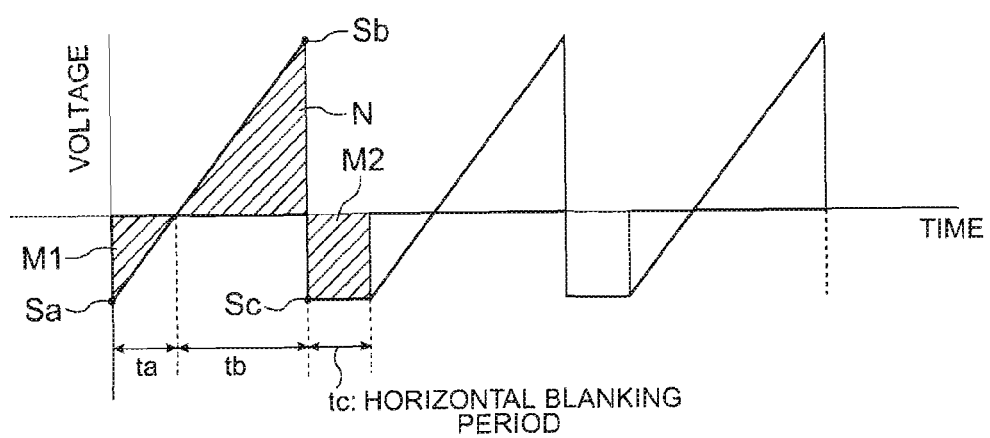
FIG. 7 is a view illustrating a waveform of a voltage applied to electrodes of the image display device according to the fourth embodiment of the invention.

Then, when a voltage applied to the second electrode 53 reaches the maximum voltage value Sb, the control unit 55 causes a refresh voltage value Sc (−100 V) to be applied during a period of time tc, as shown in FIG. 7. That is in the case when the laser beam is scanned toward the first electrode 52, the voltage applied to the second electrode 53 is large and the period of time is long. As a result, electrons are deflected toward the second electrode 53. Accordingly, the refresh voltage value Sc is applied to the second electrode 52 such that an electric field is generated in the direction from the first electrode 52 to the second electrode 53. As a result, the electrons deflected toward the first electrode 52 return toward the second electrode 53, such that the electrons within the scanning device 51 are less deflected.

Here, the refresh voltage value Sc and the period of time tc are determined by a time integration value M1 based on the initial voltage value Sa applied to the second electrode 12 and the period of time ta when a laser beam is scanned toward the second electrode 53. Specifically, the refresh voltage value Sc and the period of time tc are determined such that a sum of the time integration value M1 and a time integration value M2 based on the refresh voltage value Sc and the period of time tc is almost equal to a time integration value N based on the period of time tb from 0 V to the maximum voltage value Sb. That is, the sum of the time integration value M1 and the time integration value M2 of an applied voltage when an electric field is generated in the direction A in the optical element 13 and the time integration value N of an applied voltage when an electric field is generated in the direction B in the optical element 13 are set to be almost equal to each other.

In addition, as shown in FIG. 7, the period of time tc for which the refresh voltage value Sc is applied to the second electrode 53 is a period of time for which a laser beam returns toward the second electrode 53, that is, a horizontal blanking period. Moreover, the control unit 55 controls to stop driving the red, green, and blue colored light sources 30R, 30G, and 30B during the horizontal blanking period. That is, since nothing is displayed on the screen 35 during the horizontal blanking period, an image is not adversely affected even if a voltage is applied to the second electrode 53 of the scanning device 51 during the horizontal blanking period, in the same manner as in the second embodiment.

In the image display apparatus 50 according to the present embodiment, even in a case when laser beams are scanned toward both sides, the control unit 55 controls the power source E such that electrons within the optical element 54 are less deflected. As described above, it becomes possible to make the electrons generated within the optical element 54 less deflected. Accordingly, a trouble, such as electrical breaking of the first and second electrodes 52 and 53, occurring due to deflection of electrons can be suppressed. As a result, the life of the entire device becomes longer and it becomes possible to improve the reliability of the entire device.

Figure 8:
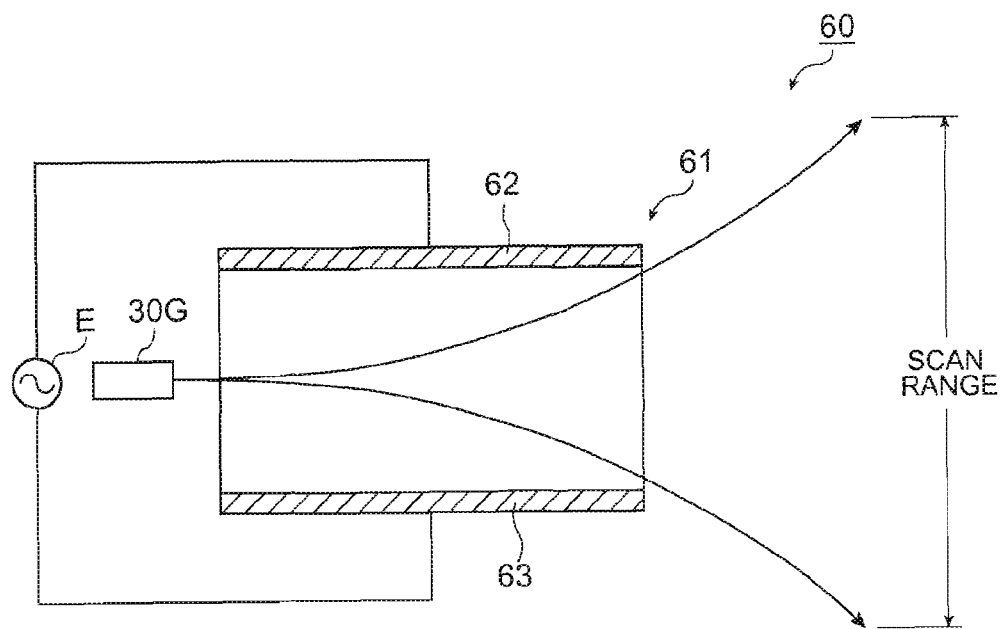
FIG. 8 is a plan view illustrating a modification of the image display device according to the fourth embodiment of the invention.
Figure 9:
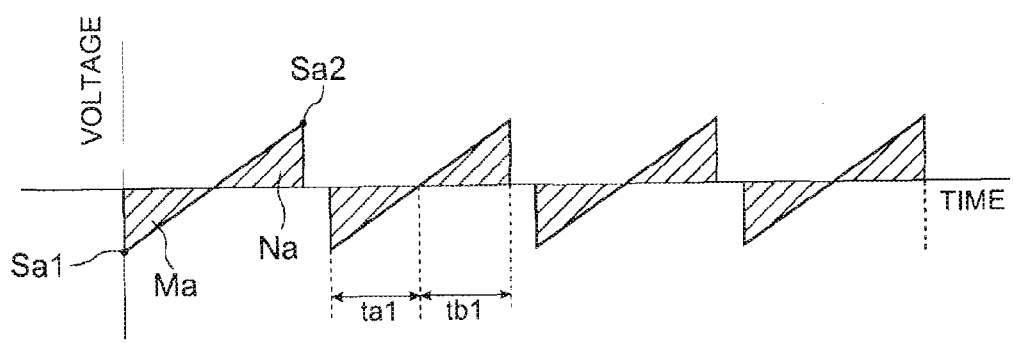
FIG. 9 is a view illustrating a waveform of a voltage applied to electrodes in the modification of the image display device according to the fourth embodiment of the invention.

Further, in the embodiment described above, a voltage is applied to the second electrode 53 such that laser beams emitted from the scanning device 51 are asymmetrically scanned left and right. However, as shown in FIG. 8, the invention may also be applied to an image display apparatus 60 that symmetrically scans laser beams left and right. A scanning device 61 of the image display apparatus 60 is a both-side scanning device that scans incident laser beams toward both sides of first and second electrodes 62 and 63 with the incident laser beams as a reference. In addition, as shown in FIG. 9, a waveform of a voltage applied to the second electrode 63 is set such that a time integration value Ma for a period of time ta1 from an initial voltage value Sa1 to 0 V and a time integration value Na for a period of time tb1 from 0 V to a maximum voltage value Sa2 are almost equal to each other. Thus, it becomes possible to make electrons generated within the scanning device 61 less deflected.

In addition, it should be understood that the technical scope of the invention is not limited to the above embodiments, but various modifications may be made without departing from the spirit and scope of the invention.

For example, in the embodiments described above, the KTN crystal has been exemplified as an optical element. However, the optical element is not limited to the KTN crystal, but an element whose refractive index linearly varies may be used.

For example, dielectric crystal, such as LiNbO$_3$ (lithium niobate), having an electro optic effect may be used. However, in the case of crystal having composition, such as LiNbO$_3$, a deflection angle at the time of scanning is small and a driving voltage is high compared with the KTN crystal. Accordingly, it is preferable to use the KTN crystal.

Moreover, even though the scanning devices according to the second to fourth embodiments have been applied to the image display apparatus, the invention is not limited thereto. For example, the scanning devices according to the second to fourth embodiments my also be applied to an optical scanner and the like.

The entire disclosure of Japanese Patent Application No. 2006-310216, filed Nov. 16, 2006 is expressly incorporated by reference herein.

What is claimed is:

1. A scanning device comprising:
an optical element in which a refractive index distribution changes according to the intensity of an electric field generated therein such that an incident laser beam is scanned to one side;
first and second electrodes provided on two opposite surfaces of the optical element; and
a control unit that controls a voltage applied to at least one of the first and second electrodes such that the electric field is generated in one direction while the laser beam is scanned to one side and then, after the laser beam is scanned to the one side, the electric field is generated in the optical element in the other direction opposite to the one direction with time by supplying a refresh voltage to at least one of the first and second electrodes, the voltage being applied such that the voltage gradually increases for a first period of time, the refresh voltage being applied for a second period of time, and the second period of time being shorter than the first period of time.

2. The scanning device according to claim 1, wherein the control unit controls a voltage such that a time integration value of an applied voltage when the electric field in the one direction is generated in the optical element is equal to a time integration value of an applied voltage when the electric field in the other direction is generated in the optical element.

3. The scanning device according to claim 1, wherein the optical element has composition of Kta$_{1-x}$Nb$_x$O$_3$.

4. A scanning type optical device comprising:
a light source that emits a laser beam; and
a scanning unit that scans the laser beam emitted from the light source toward a projected surface,
wherein the scanning unit includes the scanning device according to claim 1.

5. The scanning type optical device according to claim 4, wherein the scanning unit performs horizontal scanning.

6. The scanning type optical device according to claim 4, wherein a voltage is applied such that the electric field is generated in the one direction or the other direction in the optical element during a horizontal blanking period of a laser beam emitted toward the projected surface.

7. The scanning type optical device according to claim 4, wherein a voltage is applied such that the electric field is generated in the one direction or in the other direction in the optical element during a vertical blanking period of a laser beam emitted toward the projected surface.

8. The scanning type optical device according to claim 4, wherein the light source is not driven while the voltage value is applied such that an electric field is generated in the other direction.

9. The scanning device according to claim 1, wherein
during a period when the laser beam is scanned to the one side, a first voltage of a positive or a negative polarity is applied to at least one of the first electrode and the second electrode, and an other one of the first electrode and the second electrode is grounded such that the electric field is generated in the one direction, and the incident laser beam is deflected in the one direction, and
during a period when the laser beam is not scanned to the one side, a second voltage of the other of the positive or the negative polarity is applied to at least one of the first electrode and the second electrode, and the other one of the first electrode and the second electrode is grounded such that the electric field is generated in a direction opposite of the one direction.

10. A scanning device for scanning a laser beam, comprising:
an optical element having a first side, a second side and a refractive index;
a first electrode disposed at the first side of the optical element;
a second electrode disposed at the second side of the optical element; and
a control unit that controls a voltage applied to at least one of the electrodes, the applied voltage generating an electric field in one of a first direction and a second direction, an intensity of the electric field changing the refractive index of the optical element such that a laser beam passing through the optical element is scanned to one side, the control unit generating the electric field in the first direction while the laser beam is being scanned to the one side and generating the electric field in the second direction, opposite to the first direction, while the laser beam is not being scanned, the voltage being applied gradually such that the voltage increases for a first period of time, a refresh voltage value being applied for a second period of time, and the second period of time being shorter than the first period of time.

11. The scanning device according to claim 10, wherein
during a period when the laser beam is scanned to the one side, a first voltage of a positive or a negative polarity is applied to at least one of the first electrode and the second electrode, and an other one of the first electrode and the second electrode is grounded such that the electric field is generated in the first direction, and the incident laser beam is deflected in the first direction, and
during a period when the laser beam is not scanned to the one side, a second voltage of the other of the positive or the negative polarity is applied to at least one of the first electrode and the second electrode, and the other one of the first electrode and the second electrode is grounded such that the electric field is generated in the second direction.

* * * * *